US009631086B2

(12) United States Patent
Cramail et al.

(10) Patent No.: US 9,631,086 B2
(45) Date of Patent: Apr. 25, 2017

(54) USE OF POLYMERS AS ADDITIVES IN A POLYMER MATRIX

(71) Applicants: UNIVERSITÉ DE BORDEAUX, Bordeaux (FR); INSTITUT DES CORPS GRAS ETUDES ET RECHERCHES TECHNIQUES-ITERG, Pessac (FR); CENTRE NATIONAL DE LA RECHERCHE SCIENTIFIQUE (C.N.R.S), Paris (FR); INSTITUT POLYTECHNIQUE DE BORDEAUX, Talence (FR)

(72) Inventors: Henri Cramail, Sainte Terre (FR); Thomas Lebarbe, Bordeaux (FR); Benoit Gadenne, Le Bouscat (FR); Carine Alfos, Pessac (FR)

(73) Assignees: Université de Bordeaux, Bordeauz (FR); Institut Des Corps Gras Etudes Et Recherches Technigues—Iterg, Pessac (FR); Centre National de la Recherche Scientifique (C.N.R.S), Paris (FR); Institut Polytechnique de Bordeaux, Talence (FR)

( * ) Notice: Subject to any disclaimer, the term of this patent is extended or adjusted under 35 U.S.C. 154(b) by 0 days.

(21) Appl. No.: 14/783,409

(22) PCT Filed: Apr. 8, 2014

(86) PCT No.: PCT/EP2014/057081
§ 371 (c)(1),
(2) Date: Oct. 8, 2015

(87) PCT Pub. No.: WO2014/166959
PCT Pub. Date: Oct. 16, 2014

(65) Prior Publication Data
US 2016/0053113 A1 Feb. 25, 2016

(30) Foreign Application Priority Data
Apr. 8, 2013 (FR) .................................... 13 53138

(51) Int. Cl.
C08L 67/04 (2006.01)
C08L 25/06 (2006.01)
C08L 27/06 (2006.01)
C08L 33/06 (2006.01)
C08L 75/04 (2006.01)
C08L 77/00 (2006.01)
C08K 5/101 (2006.01)

(52) U.S. Cl.
CPC ............... C08L 67/04 (2013.01); C08L 25/06 (2013.01); C08L 27/06 (2013.01); C08L 33/06 (2013.01); C08L 77/00 (2013.01); C08L 2207/04 (2013.01)

(58) Field of Classification Search
CPC .......... C08L 25/06; C08L 27/06; C08L 33/06; C08L 67/04; C08L 77/00
(Continued)

(56) References Cited

U.S. PATENT DOCUMENTS 2,156,956 A * 5/1939 Agens ..................... C08K 5/101
524/306
3,661,956 A * 5/1972 Silverstone ........... C08F 246/00
562/509
(Continued)

FOREIGN PATENT DOCUMENTS

EP 0 978 536 A1 2/2000
GB 1 416 144 A 12/1975
(Continued)

OTHER PUBLICATIONS

Hiroki, et al. 2007 "Lipase—catalyzed synthesis and curing of high-molecular-weight polyricinoleate" *Macromolecular Bioscience* 7(6): 798-803.
(Continued)

*Primary Examiner* — Fred M Teskin
(74) *Attorney, Agent, or Firm* — Knobbe, Martens, Olson & Bear, LLP

(57) ABSTRACT

The present invention relates to the use of polymers of the following formula (I):

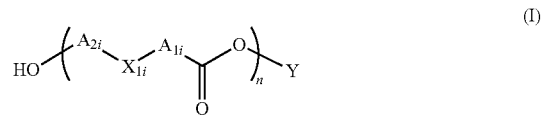

wherein:
  $A_{1i}$ represents a radical alkylene divalent comprising from 2 to 20 carbon atoms;
  $A_{2i}$ represents a radical alkylene divalent comprising from 2 to 20 carbon atoms;
  $X_{1i}$ is chosen from the group consisting of: —S—, —CH$_2$— and a bond;
  Y represents H, a phenyl group or an alkyl group comprising from 1 to 10 carbon atoms;
  i represents an integer varying from 1 to n;
  n represents an integer comprised from 2 to 1,000;
  provided that the total number of carbon atoms of the radicals $A_{2i}$, $X_{1i}$ et $A_{1i}$ is greater than or equal to 8;
as additives in a polymeric matrix chosen from the group consisting of matrices of polyester, poly(vinyl chloride), polyurethane, polyamide, poly(alkyl acrylate), poly(alkyl methacrylate), polystyrene and polyolefin, said polymer of formula (I) being different from poly (ricinoleic acid).

10 Claims, No Drawings

(58) Field of Classification Search
USPC .................................................. 525/189, 190
See application file for complete search history.

(56) References Cited

U.S. PATENT DOCUMENTS

| | | | |
|---|---|---|---|
| 5,011,629 | A | 4/1991 | Bilbo |
| 5,252,642 | A | 10/1993 | Sinclair et al. |
| 5,753,782 | A | 5/1998 | Hammond et al. |
| 6,541,568 | B1 | 4/2003 | Ding et al. |
| 2003/0083440 | A1 | 5/2003 | Sashida et al. |
| 2008/0071008 | A1 | 3/2008 | Smillie et al. |
| 2009/0030112 | A1 | 1/2009 | Nascimento et al. |
| 2013/0065046 | A1* | 3/2013 | Krishnaswamy ....... C08L 67/04 428/336 |

FOREIGN PATENT DOCUMENTS

| | | |
|---|---|---|
| WO | WO 95/16750 A1 | 6/1995 |
| WO | WO 2012/131252 A1 | 10/2012 |
| WO | WO 2012/175338 A1 | 12/2012 |

OTHER PUBLICATIONS

Robertson, et al. 2011 "Tough blends of polylactide and castor oil" *ACS Applied Materials and Interfaces* 3(9): 3402-3410.
Search Report in corresponding French Application No. 13 53138, dated Nov. 4, 2013.
Yuan, et al. 1998 "Polyurethane toughened polylactide" *Polymer Bulletin* 40(4/05): 485-490.

\* cited by examiner

USE OF POLYMERS AS ADDITIVES IN A POLYMER MATRIX

FIELD OF THE INVENTION

The object of the present invention is the use of polymers for improving impact resistance and/or assisting with nanostructuration of a polymeric matrix, notably a poly(lactic acid) polymer.

The object of the present invention is also compositions, comprising at least one polymer according to the invention and a polymeric matrix, notably poly(lactic acid).

BACKGROUND OF THE INVENTION

Thermoplastic materials, notably poly(lactic acid) generally have interesting mechanical properties. However, certain thermoplastic materials often have limited use because of their brittleness characterized by low impact resistance as well as low deformation at breakage.

In order to find a remedy to this problem, modification of thermoplastic materials by plasticization was contemplated, by mixing or else by copolymerization. The mixing of polymers proved to be a good technique. However, from the state of the art, it is known that the use of flexible polymers in a matrix of thermoplastic polymers, and notably a PLA matrix, leads to problems of incompatibility, and notably to strong phase segregation. Further, flexible polymers known from the state of the art are mostly derived from petrochemistry. Among flexible polymers, mention may notably be made of polybutadiene (Tg=−80° C.), poly(propylene oxide) (Tg=−70° C.), poly(ε-caprolactone) (Tg=−60° C.).

Thus, there exists a need for having novel flexible polymers giving the possibility of improving reinforcement to impacts of a matrix of fragile polymers, and notably of a matrix of poly(lactic acid), while not having the drawbacks of the aforementioned existing polymers. Notably, there exists a need for having novel flexible polymers for reinforcement of a biosourced polymeric matrix.

SUMMARY OF THE INVENTION

The object of the present invention is the use of polymers, notably derived from ricinoleic acid, for improving reinforcement to impacts of a polymeric matrix.

Another object of the invention is the use of polymers, notably of derivatives of ricinoleic acid, as additives of a polymeric matrix selected from the group consisting of a matrix of polyester, poly(vinyl chloride), polyurethane, polyamide, poly(alkyl acrylate), poly(alkyl methacrylate), polystyrene and polyolefins, and notably in a matrix of poly(lactic acid).

Another object of the invention is to provide a novel composition based on biosourced polymers and polymeric matrices.

DETAILED DESCRIPTION OF CERTAIN EMBODIMENTS OF THE INVENTION

The present invention relates to the use of a polymer of the following formula (I):

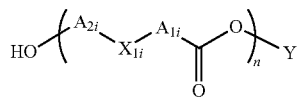

(I)

wherein:

$A_{1i}$ represents a linear or branched divalent alkylene radical comprising from 2 to 20 carbon atoms, preferably from 5 to 18, and preferentially from 6 to 17, said radical optionally comprising one or several unsaturations, and being optionally substituted with at least one —OAlk substituent, Alk representing an alkyl group comprising from 1 to 10 carbon atoms;

$A_{2i}$ represents a linear or branched divalent alkylene radical comprising from 2 to 20 carbon atoms, preferably from 2 to 15, and preferentially from 5 to 10, said radical optionally comprising one or several unsaturations, and being optionally substituted with at least one —OAlk substituent, Alk representing an alkyl group comprising from 1 to 10 carbon atoms;

$X_{1i}$ is selected from the group consisting of: —S—, —CH$_2$— and a bond;

Y represents H, a phenyl group or an alkyl group comprising from 1 to 10 carbon atoms;

i represents an integer varying from 1 to n;

n represents an integer comprised from 2 to 1,000, preferably from 2 to 500, and preferentially from 2 to 100;

provided that the total number of carbon atoms of the radicals $A_{2i}$, $X_{1i}$ and $A_{1i}$ is greater than or equal to 8, preferably greater than or equal to 10;

for preparing additives in a polymeric matrix selected from the group consisting of matrices of polyester, poly(vinyl chloride), polyurethane, polyamide, poly(alkyl acrylate), poly(alkyl methacrylate), polystyrene and polyolefin.

Thus, the polymers of formula (I) are used as additives in a polymeric matrix.

The present invention relates to the use of a polymer of the following formula (I):

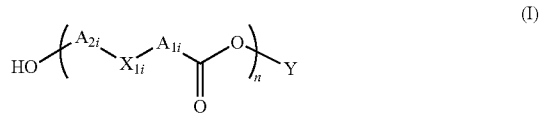

(I)

wherein:

$A_{1i}$ represents a linear or branched divalent alkylene radical, comprising from 2 to 20 carbon atoms, preferably from 5 to 18 and preferentially from 6 to 17, said radical optionally comprising one or several unsaturations, and being optionally substituted with at least one —OAlk substituent, Alk representing an alkyl group comprising from 1 to 10 carbon atoms;

$A_{2i}$ represents a linear or branched divalent alkylene radical, comprising from 2 to 20 carbon atoms, preferably from 2 to 15, and preferentially from 5 to 10, said radical optionally comprising one or several unsaturations, and being optionally substituted with at least one —OAlk substituent, Alk representing an alkyl group comprising from 1 to 10 carbon atoms;

$X_{1i}$ is selected from the group consisting of: —S—, —CH$_2$— and a bond;

Y represents H, a phenyl group or an alkyl group comprising from 1 to 10 carbon atoms;

i represents an integer varying from 1 to n;

n represents an integer comprised from 2 to 1,000, preferably from 2 to 500, and preferentially from 2 to 100;

provided that the total number of carbon atoms of the radicals $A_{2i}$, $X_{1i}$ and $A_{1i}$ is greater than or equal to 8, preferably greater than or equal to 10;

said polymer of formula (I) being different from poly(ricinoleic acid); as an additive in a polymeric matrix selected from the group consisting of matrices of polyester, poly(vinyl chloride), polyurethane, polyamide, poly(alkyl acrylate), poly(alkyl methacrylate), polystyrene and polyolefin.

According to an embodiment, the present invention relates to the use of polymers of the aforementioned formula (I), except for poly(ricinoleic acid), in order to increase reinforcement to impacts of the aforementioned polymeric matrix, and/or for assisting with nano-structuration of said matrix.

The present invention relates to the use of a polymer of formula (I) as defined above, except for poly(ricinoleic acid), in a polymeric matrix selected from the group consisting of matrices of polyester, poly(vinyl chloride), polyurethane, polyamide, poly(alkyl acrylate), poly(alkyl methacrylate), polystyrene and polyolefin.

Within the scope of the invention, the poly(ricinoleic acid) fits the following formula:

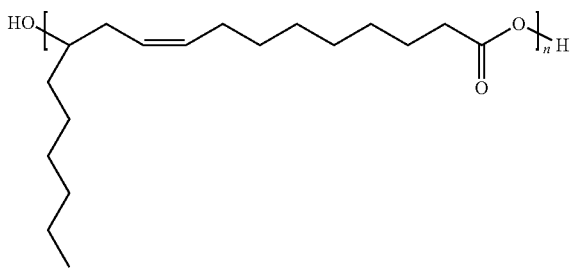

wherein n is as defined earlier.

The present invention therefore relates to the use of a polymer of the aforementioned formula (I), except for poly(ricinoleic acid) of the following formula:

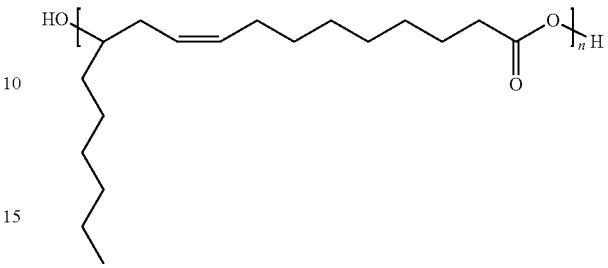

wherein n is as defined earlier;

in a polymeric matrix selected from the group consisting of matrices of polyester, poly(vinyl chloride), polyurethane, polyamide, poly(alkyl acrylate), poly(alkyl methacrylate), polystyrene and polyolefin.

According to a preferred embodiment, within the scope of the use according to the invention, the content of polymer of formula (I) is greater than or equal to 5% by mass based on the sum of the total masses of said polymer of formula (I) and of said polymeric matrix.

According to a preferred embodiment, said polymeric matrix does not comprise any compound fitting one of the following formulae (II), (III), (IV), (V) and (VI):

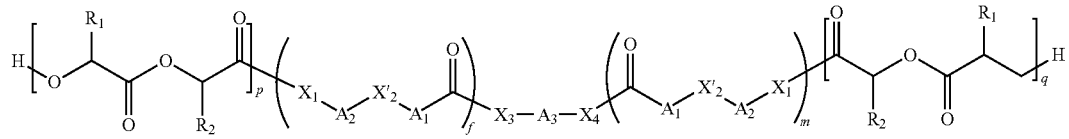
(II)

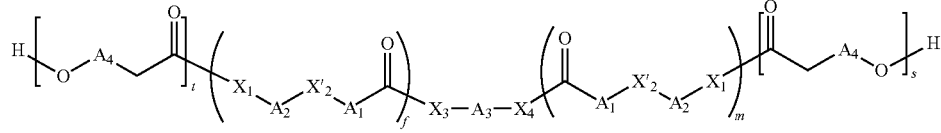
(III)

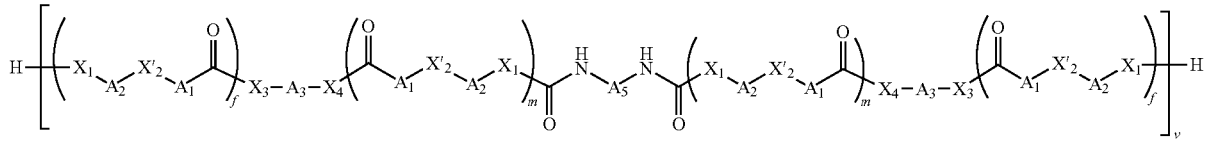
(IV)

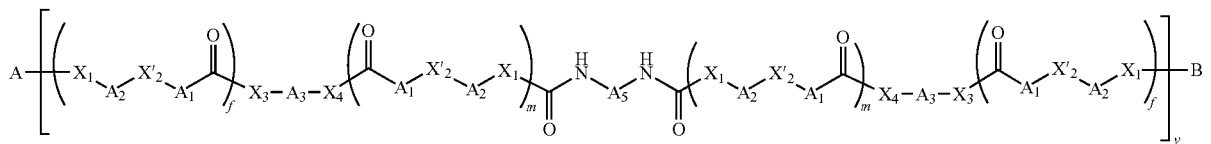
(V)

-continued

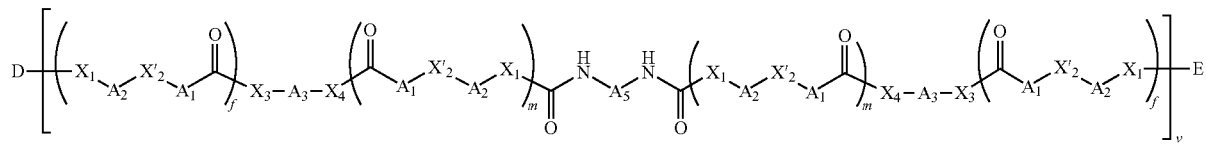

wherein:
$A_1$ represents a linear or branched divalent alkylene radical, comprising from 2 to 20 carbon atoms, preferably from 5 to 18, and preferentially from 6 to 17, said radical optionally comprising one or several unsaturations, and being optionally substituted with at least one —OAlk substituent, Alk representing an alkyl group comprising from 1 to 10 carbon atoms;

$A_2$ represents a linear or branched divalent alkylene radical, comprising from 2 to 20 carbon atoms, preferably from 2 to 12, and preferentially from 2 to 10, said radical optionally comprising one or several unsaturations, and being optionally substituted with at least one —OAlk substituent, Alk representing an alkyl group comprising from 1 to 10 carbon atoms;

$A_3$ is selected from the group consisting of the following divalent radicals:
  a linear or branched alkylene, comprising from 2 to 600 carbon atoms, preferably from 2 to 400, and preferentially from 2 to 100, said radical comprising optionally one or several unsaturations, being optionally interrupted with at least one heteroatom selected from O, N and S, and being optionally substituted with at least one —OAlk substituent, Alk representing an alkyl group comprising from 1 to 10 carbon atoms; and
  an arylene comprising from 6 to 30 carbon atoms, said radical being optionally substituted with at least one —OAlk substituent, Alk representing an alkyl group comprising from 1 to 10 carbon atoms;

$X_1$, $X_3$ and $X_4$, either identical or different, represent independently of each other, —O— or —NH—;

$X'_2$ is selected from the group consisting of: —S—, —$CH_2$— and a bond; and f and m represent, independently of each other, an integer comprised
from 1 to 1,000, preferably from 1 to 100, and preferentially from 1 to 50; provided that the total number of carbon atoms of the radicals $A_1$, $A_2$ and $X'_2$ is greater than or equal to 8, preferably greater than or equal to 10;

$R_1$ and $R_2$ represent, independently of each other, H or a linear or branched alkyl group, comprising from 1 to 20 carbon atoms, preferably from 1 to 12, and preferentially from 1 to 10, said alkyl group may optionally comprise at least one double bond or one triple bond;

$A_4$ represents a linear or branched divalent alkylene radical, comprising from 1 to 20 carbon atoms, preferably from 2 to 6, said radical optionally comprising at least one unsaturation;

$A_5$ is selected from the group consisting of the radicals:
  a linear or branched alkylene radical, comprising from 1 to 20 carbon atoms, preferably from 2 to 12, said radical optionally comprising at least one unsaturation;
  an arylene radical comprising from 6 to 20 carbon atoms, preferably from 6 to 12, said arylene radical being optionally substituted;
  a cycloalkylene radical, comprising from 3 to 20 carbon atoms, preferably from 5 to 10, said cycloalkylene radical being optionally substituted;
  a cycloalkylene-alkylene-cycloalkylene radical comprising from 6 to 30 carbon atoms; and
  an alkylene-cycloalkylene radical comprising from 4 to 15 carbon atoms;

v represents an integer comprised from 1 to 5,000, preferably from 1 to 1,000, and preferentially from 2 to 500;

A and B represent the following radicals:
A:

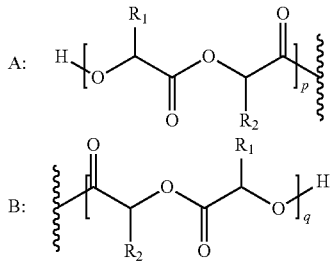

D and E represent the following radicals:
D:

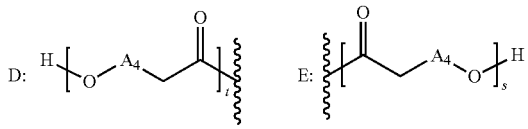

p and q represent, independently of each other, an integer comprised from 1 to 5,000, preferably from 1 to 1,000, and preferentially from 2 to 500;

t and s represent, independently of each other, an integer comprised from 1 to 5,000, preferably from 1 to 1,000, and preferentially from 2 to 500.

Within the scope of the use according to the invention, preferably the content of polymer of formula (I) in the aforementioned polymeric matrix is greater than or equal to 10% by mass based on the sum of the total masses of said polymer of formula (I) and of said polymeric matrix.

Within the scope of the use according to the invention, preferably, the content of polymer of formula (I) in the aforementioned polymeric matrix is greater than or equal to 15% by mass based on the sum of the total masses of said polymer of formula (I) and of said polymeric matrix.

Within the scope of the use according to the invention, preferably the content of polymer of formula (I) in the aforementioned polymeric matrix is greater than or equal to 20% by mass based on the sum of the total masses of said polymer of formula (I) and of said polymeric matrix.

According to the invention, i is an integer assuming all the values comprised from 1 to n.

According to the invention, the polymers of formula (I) may be represented by the following formula:

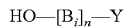

wherein each $B_i$ represents $-A_{2i}-X_{1i}-A_{1i}-COO-$ and for each given value of i, $A_{1i}$, $A_{2i}$, $X_{1i}$, Y, i and n being as defined earlier.

According to the invention, the polymers of formula (I) comprise the following recurrent units $B_i$:

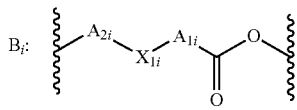

said recurrent units $B_i$ being repeated n times.

According to the invention, the recurrent units $B_i$ may be identical or different depending on the value of i. Thus, the groups $X_{1i}$, $A_{2i}$ and $A_{1i}$ may be either identical or different for each recurrent unit.

In particular, the polymer of formula (I) may be represented according to the following formula:

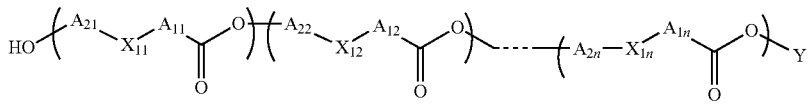

According to an embodiment, the units $B_i$ are identical.

According to an embodiment, the present invention relates to the use as additives, of polymers of the following formula (I-1):

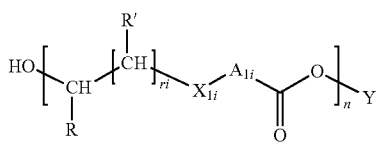

wherein:

$X_{1i}$, $A_{1i}$, Y and n are as defined earlier;

R represents H or a linear or branched divalent alkyl radical comprising from 1 to 20 carbon atoms, preferably from 2 to 10, preferentially from 4 to 9, said alkyl radical being optionally substituted with at least one OAlk group, Alk being as defined earlier;

R' represents H or an OAlk group, Alk being as defined earlier;

$r_i$ representing an integer comprised from 0 to 5, preferably from 0 to 2.

According to an embodiment, the present invention relates to the use as additives, of polymers of the following formula (I-1):

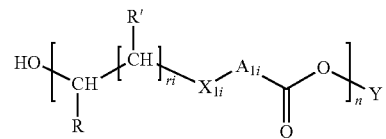

wherein:

$X_{1i}$, $A_{1i}$, Y and n are as defined earlier;

R represents H or a linear or branched divalent alkyl radical comprising from 1 to 20 carbon atoms, preferably from 2 to 10, preferentially from 4 to 9, said alkyl radical being optionally substituted with at least one OAlk group, Alk being as defined earlier;

R' represents H or an OAlk group, Alk being as defined earlier;

$r_i$ represents an integer comprised from 0 to 5, preferably from 0 to 2, said polymer of formula (I-1) being different from poly(ricinoleic acid).

According to the invention, the polymers of formula (I-1) corresponds to compounds of formula (I) wherein at least one group $A_{2i}$ represents $-CH(R)-[CH(R')]_{ri}-$.

According to an embodiment, all the groups $A_{2i}$ represent $-CH(R)-[CH(R')]_{ri}-$.

Preferably, in formulae (I) and (I-1), n is comprised from 2 to 1,000, preferably from 2 to 500, and preferentially from 2 to 100.

According to an embodiment, in the polymers of formulae (I) and (I-1), at least one group $A_{1i}$ comprises an unsaturation.

According to an embodiment, in the polymers of formulae (I) and (I-1), at least one group $A_{1i}$ is not substituted.

According to an embodiment, in the polymers of formulae (I) and (I-1), at least one group $A_{1i}$ represents an alkylene radical comprising from 2 to 9 carbon atoms, preferably from 6 to 9 carbon atoms.

According to an embodiment, in the polymers of formulae (I) and (I-1), at least one group $A_{1i}$ represents a linear alkylene radical comprising 9 carbon atoms and one unsaturation. Preferably, at least one group $A_{1i}$ represents $-CH=CH-(CH_2)_7-$.

According to an embodiment, in the polymers of formulae (I) and (I-1), at least one group $A_{1i}$ represents $-(CH_2)_7-$.

According to an embodiment, in the polymers of formulae (I) and (I-1), at least one group $A_{1i}$ represents $-(CH_2)_6-$.

According to an embodiment, in the polymers of formulae (I) and (I-1), at least one group $A_{1i}$ represents $-(CH_2)_{10}-$.

According to an embodiment, in the polymers of formulae (I) and (I-1), at least one group $A_{1i}$ represents a branched alkylene radical, comprising 17 carbon atoms. Preferably, at least one group $A_{1i}$ represents $-CH[(CH_2)_7CH_3]-(CH_2)_8-$.

According to an embodiment, in the polymers of formulae (I) and (I-1), all the groups $A_{1i}$ are identical for each recurrent unit.

According to an embodiment, in the polymers of formulae (I) and (I-1), at least one group $X_{1i}$ represents a bond.

According to another embodiment, in the polymers of formulae (I) and (I-1), the group $X_{1i}$ represents —$CH_2$—.

According to an embodiment, in the polymers of formulae (I) and (I-1), the group $X_{1i}$ represents S.

According to an embodiment, in the polymers of formulae (I) and (I-1), all the groups $X_{1i}$ are identical for each recurrent unit.

According to an embodiment, in the polymers of formulae (I) and (I-1), the group Y represents H.

According to an embodiment, in the polymers of formulae (I) and (I-1), the group Y represents an alkyl group comprising from 1 to 10 carbon atoms, and preferably a methyl group.

According to an embodiment, in the polymers of formula (I), at least one group $A_{2i}$ represents a linear alkylene radical comprising two carbon atoms, and optionally substituted with an OAlk group, notably an OMe group.

Preferably, at least one group $A_{2i}$ represents —$CH_2CH$(OMe)- or —$CH_2CH_2$—.

According to another embodiment, in the polymers of formula (I), at least one group $A_{2i}$ represents a branched alkylene radical comprising from 2 to 10 carbon atoms, optionally substituted with an OAlk group, notably an OMe group. Preferably, at least one group $A_{2i}$ represents —CH[($CH_2)_5CH_3$]—, —CH[($CH_2)_7CH_3$]—CH(OMe)-, —CH($CH_2$(OMe)-, or —CH[CH(OMe)-($CH_2)_7$—$CH_3$]—.

According to an embodiment, in the polymers of formulae (I) and (I-1), all the groups $A_{2i}$ are identical for each recurrent unit.

According to an embodiment, in the polymers of formula (I-1), at least one $r_i$ represents 0 or 1.

According to an embodiment, in the polymers of formulae (I) and (I-1), all the $r_i$ are identical for each recurrent unit.

According to an embodiment, in the polymers of formula (I-1), at least one group R' represents H.

According to an embodiment, in the polymers of formula (I-1), at least one group R' represents OAlk, and notably OMe.

According to an embodiment, in the polymers of formula (I-1), at least one group R represents H.

According to an embodiment, in the polymers of formula (I-1), at least one group R represents —($CH_2)_5CH_3$.

According to an embodiment, in the polymers of formula (I-1), at least one group R represents —($CH_2)_7CH_3$.

According to an embodiment, in the polymers of formula (I-1), at least one group R represents —$CH_2OMe$.

According to an embodiment, in the polymers of formula (I-1), at least one group R represents —CH[($CH_2)_7CH_3$](OMe)-.

According to an embodiment, in the polymers of formulae (I) and (I-1), all the groups R are identical for each recurrent unit.

According to an embodiment, in the polymers of formulae (I) and (I-1), all the groups R' are identical for each recurrent unit.

According to a particular embodiment, the polymers of formulae (I) and (I-1) are selected from the group consisting of polymers fitting one of the following formulae:

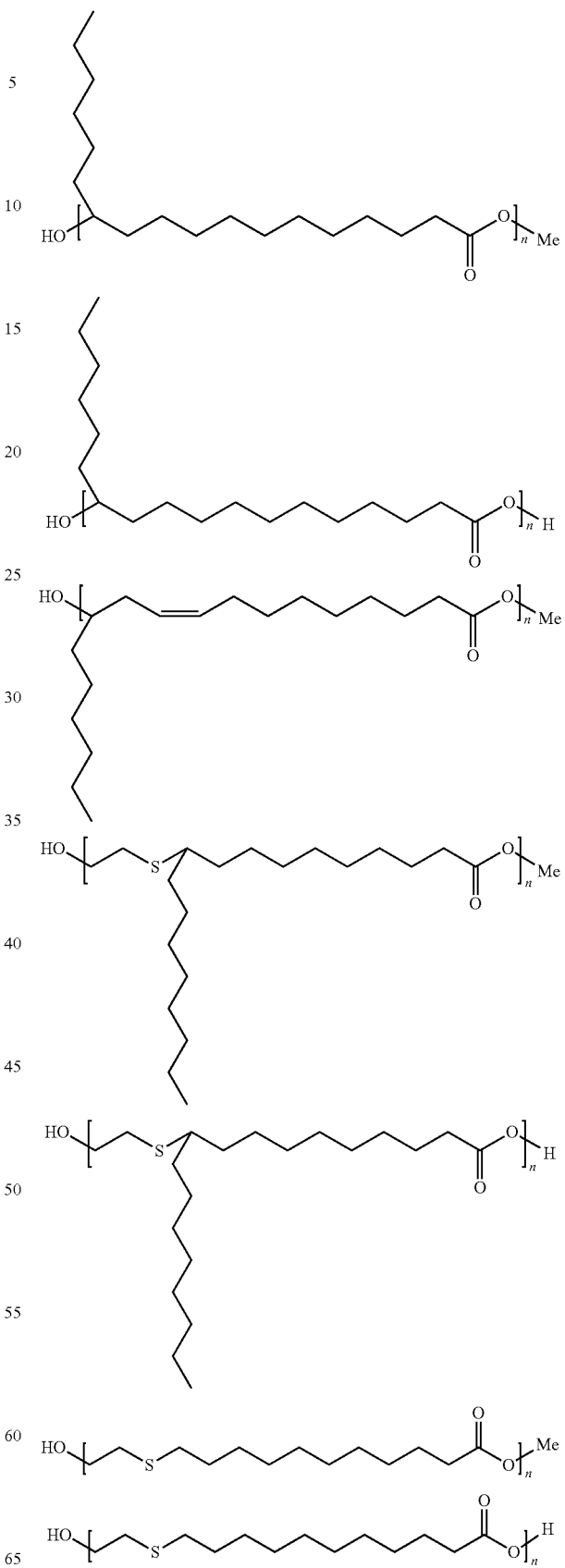

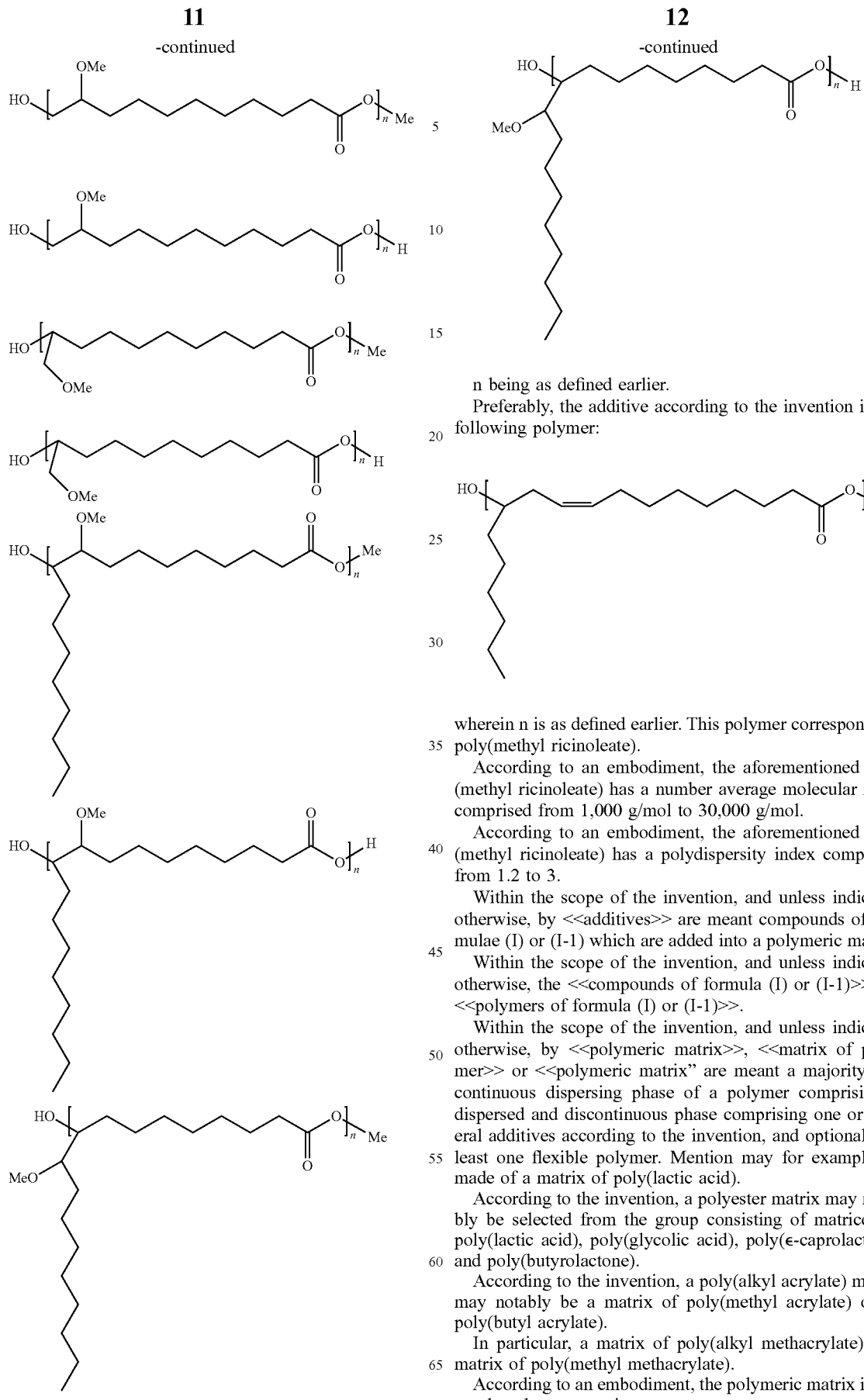

n being as defined earlier.

Preferably, the additive according to the invention is the following polymer:

wherein n is as defined earlier. This polymer corresponds to poly(methyl ricinoleate).

According to an embodiment, the aforementioned poly(methyl ricinoleate) has a number average molecular mass comprised from 1,000 g/mol to 30,000 g/mol.

According to an embodiment, the aforementioned poly(methyl ricinoleate) has a polydispersity index comprised from 1.2 to 3.

Within the scope of the invention, and unless indicated otherwise, by <<additives>> are meant compounds of formulae (I) or (I-1) which are added into a polymeric matrix.

Within the scope of the invention, and unless indicated otherwise, the <<compounds of formula (I) or (I-1)>> are <<polymers of formula (I) or (I-1)>>.

Within the scope of the invention, and unless indicated otherwise, by <<polymeric matrix>>, <<matrix of polymer>> or <<polymeric matrix" are meant a majority and continuous dispersing phase of a polymer comprising a dispersed and discontinuous phase comprising one or several additives according to the invention, and optionally at least one flexible polymer. Mention may for example be made of a matrix of poly(lactic acid).

According to the invention, a polyester matrix may notably be selected from the group consisting of matrices of poly(lactic acid), poly(glycolic acid), poly(ε-caprolactone) and poly(butyrolactone).

According to the invention, a poly(alkyl acrylate) matrix may notably be a matrix of poly(methyl acrylate) or of poly(butyl acrylate).

In particular, a matrix of poly(alkyl methacrylate) is a matrix of poly(methyl methacrylate).

According to an embodiment, the polymeric matrix is not a polycarbonate matrix.

According to an embodiment, the present invention relates to the use of the polymers of the aforementioned formulae (I) or (I-1) for increasing the reinforcement to impacts of the aforementioned polymeric matrix, and/or for assisting with nano-structuration of said matrix.

According to an embodiment, the present invention relates the improvement of the mechanical properties of thermoplastic materials, in particular resistance to impacts, as well as to the nano-structuration of a polymeric matrix, notably a poly(lactic acid) matrix.

According to an embodiment, the use of the aforementioned polymers of formulae (I) or (I-1), except for poly (ricinoleic acid) gives the possibility of having an elongation at break of a poly(lactic acid) matrix of 3 to 50 times greater relatively to that of said matrix alone, preferably from 35 to 50 times higher.

Preferably, the use of the polymers of the aforementioned formulae (I) or (I-1) gives the possibility of having an elongation at break of a poly(lactic acid) matrix from 3.5 to 50, preferably from 35 to 50.

Within the scope of the invention, and unless indicated otherwise, by <<elongation at break>>, or <<elongation at breakage>>, or <<A %>> is meant the capability of a material of elongating before breaking when it is subject to traction. This characteristic is determined by a tensile test according to the following expression:

$$A\% = 100 \cdot \frac{L_u - L_o}{L_o}$$

Lu representing the final length just before break;
Lo representing the initial length before the beginning of the tensile test.
Lu and Lo being expressed in the same unit, in particular in millimeters.

Within the scope of the invention, the crystallinity level may be measured according to the following equation:

$$\chi_c = \frac{\Delta H_m - \Delta H_{cc}}{\Delta H_m^0} \times \frac{1}{\omega}$$

wherein $\Delta H_m$ is the melting enthalpy of the PLLA, $\Delta H_{cc}$ is the cold crystallization enthalpy, $\Delta H_m^0$ is the melting enthalpy of 100% crystalline PLLA (93 J/g) and w is the mass fraction of PLLA in a mixture.

According to an embodiment, the use of polymers of the aforementioned formulae (I) or (I-1), except for poly(ricinoleic acid), is such that the crystallinity level of the poly(lactic acid) matrix is comprised from 38% to 50%.

Within the scope of the invention, and unless indicated otherwise, by <<reinforcement to impacts>> is meant an improvement in the mechanical properties (better elongation at break, decrease in the brittleness of the material), notably by dispersion of an additive in the matrix allowing said impact reinforcement.

Within the scope of the invention, and unless indicated otherwise, by <<assistance with nano-structuration of a matrix>> is meant assistance with crystallization and/or assistance with phase segregation of said matrix according to the laws of thermodynamics, notably leading to cylindrical, lamellar, gyroid phases being obtained.

According to an embodiment, the matrix is of the polyester type, in particular of the poly(lactic acid) (PLA) type. Preferably, the matrix is of the poly(L-lactic acid) type.

According to an embodiment, the aforementioned PLA matrix has a number average molecular mass comprised from 50,000 g/mol to 500,000 g/mol.

According to an embodiment, the aforementioned PLA matrix has a polydispersity index comprised from 1.1 to 3.

From among the <<alkyl>> radicals, mention may notably be made, when they are linear, of methyl, ethyl, propyl, butyl, pentyl, hexyl, octyl, nonyl and decyl radicals. Mention may notably be made, when they are branched or substituted with one or several alkyl radicals, of isopropyl, tert-butyl, 2-ethylhexyl, 2-methylbutyl, 2-methylpentyl, 1-methylpentyl and 3-methylheptyl radicals.

Within the scope of the present invention, the <<alkylene>> radicals represent radicals (also called alkylidene radicals) derived from alkanes for which both end hydrogen atoms have been suppressed. When said alkylene radicals are linear, they may be represented by the formula —$(CH_2)_k$—, k corresponding to the number of carbon atoms of the alkane from which is derived the alkylene radical.

The present invention also relates to a composition comprising:
  a polymeric matrix selected from the group consisting of matrices of polyester, poly(vinyl chloride), polyurethane, polyamide, poly(alkyl acrylate), poly(alkyl methacrylate), polystyrene and polyolefin;
  at least one polymer of the aforementioned formula (I), except for poly(ricinoleic acid); and
  optionally at least one other polymer notably selected from poly(butadiene), poly(isoprene), poly(ε-caprolactone), poly(tetrahydrofurane), poly(propylene glycol) and poly(propylene oxide).

Thus, the aforementioned composition of the invention does not comprise any poly(ricinoleic acid).

According to an embodiment, the invention relates to a composition comprising a matrix of poly(lactic acid), and at least one polymer fitting one of the formulae (I), (I-1) or mixtures thereof, except for poly(ricinoleic acid).

According to an embodiment, the invention relates to a composition comprising a poly(lactic acid) matrix, and at least 5% by mass of a polymer fitting one of the formulae (I), (I-1) or mixtures thereof, except for poly(ricinoleic acid), based on the total mass of said composition.

According to an embodiment, the invention relates to compositions comprising from 5% to 20% by mass of a copolymer of formula (I) except for poly(ricinoleic acid), based on the total mass of the composition.

According to an embodiment, the invention relates to compositions comprising from 60% to 95% by mass, preferably from 80% to 90%, of the aforementioned polymeric matrix.

The present invention also relates to a composition consisting of:
  a polymeric matrix selected from the group consisting of matrices of polyester, poly(vinyl chloride), polyurethane, polyamide, poly(alkyl acrylate), poly(alkyl methacrylate), polystyrene and polyolefin;
  at least one polymer of the aforementioned formula (I); and
  optionally at least one other polymer notably selected from poly(butadiene), poly(isoprene), poly(ε-caprolactone), poly(tetrahydrofurane), poly(propylene glycol) and poly(propylene oxide).

As polymers of formula (I) in the compositions of the invention, mention may be made of those fitting the following formula:

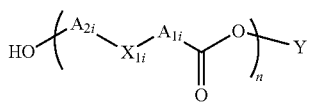

wherein:
- $A_{1i}$ represents a linear or branched divalent alkylene radical, comprising from 2 to 20 carbon atoms, preferably from 5 to 18, and preferentially from 6 to 17, said radical optionally comprising one or several unsaturations, and being optionally substituted with at least one —OAlk substituent, Alk representing an alkyl group comprising from 1 to 10 carbon atoms;
- $A_{2i}$ represents a linear or branched divalent alkylene radical, comprising from 2 to 20 carbon atoms, preferably from 2 to 15, and preferentially from 5 to 10, said radical optionally comprising one or several unsaturations, and being optionally substituted with at least one —OAlk substituent, Alk representing an alkyl group comprising from 1 to 10 carbon atoms;
- $X_{1i}$ is selected from the group consisting of: —S—, —CH$_2$— and a bond;
- Y represents H, a phenyl group or an alkyl group comprising from 1 to 10 carbon atoms;
- i represents an integer varying from 1 to n;
- n represents an integer comprised from 2 to 1,000, preferably from 2 to 500, and preferentially from 2 to 100; provided that the total number of carbon atoms of the radicals $A_{2i}$, $X_{1i}$ and $A_{1i}$ is greater than or equal to 8, preferably greater than or equal to 10.

In particular mention may be made of the polymer of the following formula (I):

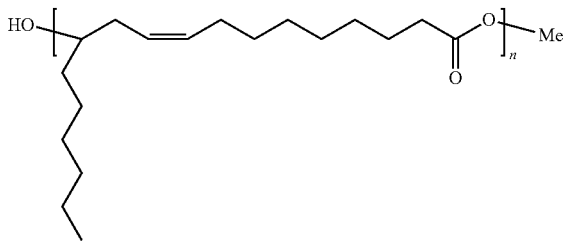

wherein n is as defined earlier. This polymer corresponds to poly(methyl ricinoleate).

In particular, mention may be made of the polymer of the following formula (I):

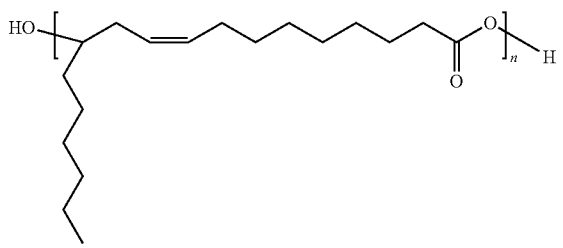

wherein n is as defined earlier. This polymer corresponds to poly(ricinoleic acid).

According to an embodiment, the present invention relates to a composition consisting of:

- a polymeric matrix selected from the group consisting of matrices of polyester, poly(vinyl chloride), polyurethane, polyamide, poly(alkyl acrylate), poly(alkyl methacrylate), polystyrene and polyolefin;
- at least one polymer of formula (I), except for poly(ricinoleic acid); and
- optionally at least one other polymer notably selected from poly(butadiene), poly(isoprene), poly(ϵ-caprolactone), poly(tetrahydrofurane), poly(propylene glycol) and poly(propylene oxide).

The present invention also relates to a composition consisting of:

- a polymeric matrix selected from the group consisting of matrices of polyester, poly(vinyl chloride), polyurethane, polyamide, poly(alkyl acrylate), poly(alkyl methacrylate), polystyrene and polyolefin;
- at least 5% by mass of a polymer of formula (I) based on the total mass of said composition; and
- optionally at least other polymer notably selected from poly(butadiene), poly(isoprene), poly(ϵ-caprolactone), poly(tetrahydrofurane), poly(propylene glycol) and poly(propylene oxide).

According to an embodiment, in the aforementioned compositions, the polymers of formula (I) as defined above, fit the formula (I-1).

According to an embodiment, the aforementioned compositions may comprise a mixture of polymers of formula (I).

In particular, these mixtures of polymers of formula (I) may be:
- mixtures of polymers of formula (I);
- mixtures of polymers of formulae (I) and (I-1);
- mixtures of polymers of formula (I-1).

According to an embodiment, a mixture of polymers of formula (I) may correspond to a mixture of polymers of formula (I) for which at least one radical $A_{1i}$, $A_{2i}$ and/or $X_{1i}$ has a different definition or n has a different value.

According to an embodiment, the invention relates to a composition consisting of a poly(lactic acid) matrix, and of at least one polymer fitting one of the formulae (I), (I-1) or mixtures thereof.

According to an embodiment, the invention relates to a composition consisting of a poly(lactic acid) matrix, and of at least 5% by mass of a polymer fitting one of the formulae (I), (I-1) or mixtures thereof, based on the total mass of said composition.

According to an embodiment, the invention relates to compositions consisting of 5% to 20% by mass of a copolymer of formula (I), based on the total mass of the composition.

According to an embodiment, the invention relates to compositions consisting of 60 to 95% by mass, preferably from 80 to 90%, of the aforementioned polymeric matrix.

According to an embodiment, the invention relates to compositions consisting of 95% by mass of said polymeric matrix and of 5% by mass of a polymer of formula (I).

According to an embodiment, the invention relates to compositions consisting of 90% by mass of said polymeric matrix and of 10% by mass of a polymer of formula (I).

According to an embodiment, the invention relates to compositions consisting of 85% by mass of said polymeric matrix and of 15% by mass of a polymer of formula (I).

According to an embodiment, the invention relates to compositions consisting of 80% by mass of said polymeric matrix and of 20% by mass of a polymer of formula (I).

The compositions according to the invention may be obtained by conventional extrusion, and notably by extrusion by means of a twin-screw extruder.

The compositions according to the invention may thus assume different shapes at the outlet of the extruder depending on the use for which they are intended (granules, threads, fibers, filaments by melt spinning).

The present invention relates to a method for preparing a composition according to the invention comprising a mixing step, notably a mechanical mixing by conventional extrusion, of at least one polymer of formula (I) as defined above, of an aforementioned polymeric matrix, and optionally of at least one other polymer notably selected from poly(butadiene), poly(isoprene), poly(ε-caprolactone), poly(tetrahydrofurane), poly(propylene glycol) and poly(propylene oxide), said mixing step being carried out at a temperature comprised from 180° C. to 190° C., for at least 15 minutes.

According to an embodiment, the mixing step is carried out by extrusion by means of a twin-screw extruder.

According to an embodiment, the mixing step is carried out at 180° C. for 5 minutes.

According to the invention, the mixing time is sufficiently short so as to avoid creation of covalent bonds between the polymer of formula (I), the polymeric matrix, and optionally another polymer notably selected from poly(butadiene), poly(isoprene), poly(ε-caprolactone), poly(tetrahydrofurane), poly(propylene glycol) and poly(propylene oxide). Advantageously, this is a physical mixture of said aforementioned compounds.

Thus, the present invention advantageously relates to compositions of improved thermoplastic materials comprising at least one polymeric matrix, notably poly(lactic acid).

It is known that the brittleness of a polymer may be limited by dispersing a flexible polymer in the matrix of the polymer to be improved. However, from the state of the art, it is known that incompatibility of the dispersed phase and of the dispersing phase (matrix) most often causes phase segregation at a macroscopic scale which deteriorates the mechanical properties of the mixture over time.

Thus, it was shown that the use of at least one polymer of formula (I), (I-1) or mixtures thereof, in a polymeric matrix optionally comprising a flexible polymer, advantageously gives the possibility of increasing the reinforcement to impacts of said polymeric matrix while limiting the incompatibility problems, and notably by limiting the phase segregation problems as observed in the absence of the compounds according to the invention.

The polymers of formula (I) or (I-1) are of particular interest as additives insofar that they are derived from bio-resources.

The use of polymers of formulae (I) or (I-1) advantageously gives the possibility of increasing the reinforcement to impacts of a polymeric matrix, notably selected from the group consisting of matrices of polyester, poly(vinyl chloride), polyurethane, polyamide, poly(alkyl acrylate), poly(alkyl methacrylate), polystyrene and polyolefin, without affecting too much the other mechanical properties of the polymer of said matrix. More particularly, the use of the compounds of formulae (I) or (I-1) according to the invention advantageously gives the possibility of increasing the elongation at break of the polymer of said matrix, and thus gives the possibility of making the polymer less brittle and/or improving its capability of hot and/or cold deformation. In particular, it is known that PLA is easily broken. Thus, the use of polymers of formulae (I) or (I-1) according to the invention advantageously gives the possibility of increasing the reinforcement to impacts of the PLA, and therefore making it less brittle. The PLA therefore breaks at much higher elongations than without using the polymers of formulae (I) or (I-1) according to the invention.

Further, the use of the polymers of formulae (I) or (I-1) as additives to a PLA matrix advantageously gives the possibility of assisting with the nano-structuration of the polymer of said matrix, and notably with the crystallization of said polymeric matrix. The incorporation of polymers of formula (I) or (I-1) advantageously gives the possibility of significantly increasing the crystallinity level of a PLA matrix, as well as the crystallization kinetics of said matrix.

Additionally, the reinforcement to impacts of a polymeric matrix notably selected from the group consisting of matrices of polyester, poly(vinyl chloride), polyurethane, polyamide, poly(alkyl acrylate), poly(alkyl methacrylate), polystyrene and polyolefin, and notably of PLA, as well as the assistance with nano-structuration were advantageously observed while limiting the incompatibility problems between the matrix and the additives, unlike what is typically observed with the polymers described in the state of the art.

Finally, the compositions according to the invention are also advantageous in so far that they notably consist of PLA and of polymers of formula (I), and notably of poly(methyl ricinoleate) which are derived from bio-resources. Said compositions therefore have good biocompostability properties.

The following examples allow illustration of the present invention without however limiting it.

EXAMPLES

Abbreviations

PLA: poly(lactic acid)
PLLA: poly(L-lactic acid)
Suppliers:
  85% methyl ricinoleate: ITERG
  99% Ti(OBu)$_4$: Sigma Aldrich Example 1

Preparation of poly(methyl ricinoleate) (2)

Poly(methyl ricinoleate) PRic was obtained by polycondensation of methyl ricinoleate (1) at 180° C. in a dynamic vacuum for 24 h by using Ti(OBu)$_4$ as a catalyst. The material was then analyzed by SEC (Size Exclusion Chromatography) revealing a number average molar mass of 12,600 g/mol and a dispersity of 2.02. A DSC analysis as for it gave the possibility of measuring a Tg of −70° C.

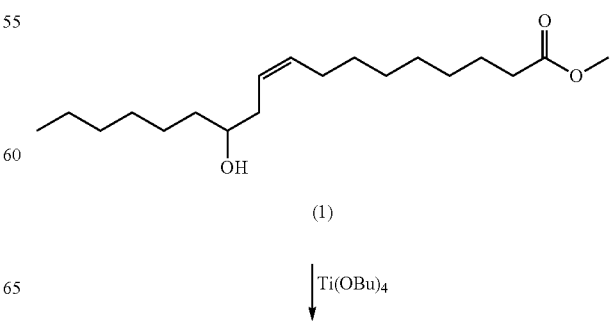

-continued

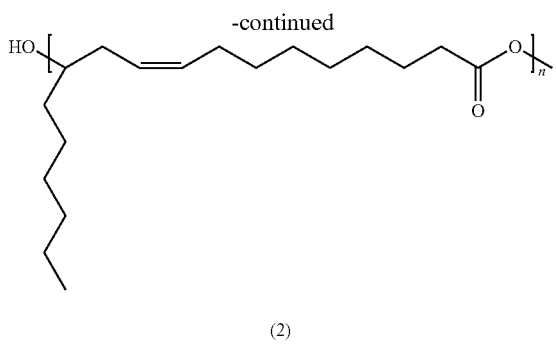

(2)

Example 2

Study of Binary Mixtures

Binary mixtures of the polymer (2) with PLLA were produced by twin-screw extrusion at 180° C. for 5 minutes. The extrudates were analyzed by DSC, DMA (Dynamic Mechanical Analysis) as well as by SEM in order to evaluate the morphology of the mixture as well as the thermomechanical properties.

For DSC analyses, the sample was heated beforehand up to a temperature of 190° C. with a heating rate of 10° C./min, and then cooled down to −80° C. at a rate of 10° C./min. Second heating up to 200° C. gave the possibility of obtaining the different physical transitions of the material.

Crystallization

First, by observing the DSC thermogram during the lowering of the temperature (10° C./min) from the molten state, significant crystallization was noted for the different mixtures considering the significant exotherm around 110-120° C. In the case of PLLA alone, a very small exotherm (1.76 J/g versus 31-37 J/g for the mixtures) was observed, indicating slight crystallization of the PLLA chains. This incomplete crystallization of PLLA alone is characterized by cold crystallization when the sample is heated at a rate of 10° C./min. Indeed, the large exotherm around 140° C. during the heating means that the polymeric chains, once they are above Tg, have sufficient mobility in order to induce crystallization of the PLLA chains. This cold crystallization is not visible for mixtures with the polymer (2) because of the complete crystallization of the PLLA chains upon lowering the temperature. This study therefore demonstrates the nucleating nature of the particles of polymer (2) on the crystallization of PLLA.

As regards the melting temperature, it was noted that it remains constant (between 173 and 179° C.) in spite of the incorporation of polymer (2). The melting and cold crystallization enthalpy values gave the possibility of measuring the crystallinity level ($\chi_c$) of the PLLA alone as well as of PLLA in the mixtures according to the following relationship:

$$\chi_c = \frac{\Delta H_m - \Delta H_{cc}}{\Delta H_m^0} \times \frac{1}{\omega}$$

wherein $\Delta H_m$ is the melting enthalpy of PLLA, $\Delta H_{cc}$ the cold crystallization enthalpy, $\Delta H_m^0$ the melting enthalpy of 100% crystalline PLLA (93 J/g) and w the mass fraction of PLLA in the mixture.

The values of the crystallinity levels versus the mass percentage of polymer (2) in the mixture are illustrated in the following table:

TABLE 1

| Crystallinity level of PLLA alone and of PLLA in the mixtures. | |
|---|---|
| % by mass of PLLA (%) | $X^c$ (%) |
| 100 | 10 |
| 95 | 39.9 |
| 90 | 45.8 |
| 80 | 44.6 |

The incorporation of polymer (2) into a PLLA matrix therefore gives the possibility of significantly increasing the crystallinity level. Indeed, the crystallinity level of the PLLA alone is of 10% and increases up to 46% when 10% of polymer (2) is introduced into the mixture.

Dynamic mechanical analysis of the PLLA alone as well as of the mixtures was also carried out in order to determine the specific properties of the mixtures. In the case of PLLA alone, a sudden drop in the elastic modulus around 60° C. was seen because of the glassy transition of the polymer. This is expressed by a strong intensity of tan δ at this temperature because of the strong damping. The value of the elastic modulus then increases from 90° C. in order to attain a value of the order of $0.5 \cdot 10^8$ Pa. This increase in the elastic modulus is due to the crystallization of the PLLA generated by the increase in the mobility of the chains after the glassy transition. This significant damping during Tg is one of the major drawbacks of PLLA. In order to overcome this, the crystallization rate of the PLLA should be increased in order to limit the drop of the modulus during Tg. Thus, it would be possible to contemplate various applications of PLLA at a higher temperature. Now, it was shown earlier by DSC analyses that the incorporation of polymer (2) gave the possibility of attaining more substantial crystallinity levels.

This is confirmed by dynamic mechanical analyses considering the limitation of the drop of elastic modulus during Tg in the case of binary mixtures. Further, the elastic modulus at higher temperatures is much greater for the mixtures than for PLLA alone, indicating a larger crystallinity level in the case of the mixtures and therefore better mechanical strength. By observing the tan δ curve versus temperature in the case of the mixtures, it was noticed that certain fluctuations of tan δ between the Tg of the polymer (2) located around −60° C. and that of PLLA located around 60° C. This indicates partial miscibility of the polymer (2) with the matrix. However, a phase micro-separation is all the same observed considering the two distinct Tgs of the homopolymers. The assumption of partial miscibility at the interface between the particles of polymer (2) and the PLLA matrix may therefore be made. This partial miscibility may explain the nucleating nature of the polymer (2) on the crystallization of PLLA because of the enhancement of the mobility of the PLLA chains.

The phase micro-separation was actually able to be demonstrated by scanning electron microscopy. In the case of the three mixtures, the microstructure of the samples is characterized by micro-domains of polymer (2) in a PLLA matrix. The average size of the particles of polymer (2) in the mixtures was able to be measured and appears in the following table 2. This average size varies very little depending on the mass percentage of polymer (2) in the mixture. The standard deviation also varies very little with the mass percentage of polymer (2). This actually shows that the partial miscibility of the polymer (2) and of the PLLA causes stabilization of the dispersed phase because of the large size homogeneity of the particles.

TABLE 2

Average size of the particles of polymer (2) in the different binary mixtures.

| % by mass of the polymer (2) (%) | Average size of the particles of polymer (2) (μm) |
| --- | --- |
| 5 | 1.88 ± 0.95 |
| 10 | 1.50 ± 0.64 |
| 20 | 2.05 ± 0.90 |

Mechanical Tests

Mechanical tensile tests were carried out on the mixtures (Table 3). A fragile/ductile transition was observed when some polymer (2) is incorporated into the PLA matrix. Indeed, a flow threshold appears with the addition of polymer (2) which allows the mixture to break for elongations at break ranging from 14% to 197%, while PLLA alone breaks at an elongation of 4%. Young's modulus very slightly varies with incorporation of polymer (2) into the mixture. The latter passes from 1.5 GPa to 1.2 GPa when 10% by mass of polymer (2) is introduced into the PLLA matrix. This moderate decrease in Young's modulus as well as of the maximum stress may be explained by the higher crystallinity level in the case of the mixtures.

TABLE 3

Mechanical properties of PLLA and of the binary mixtures.

| % by mass of polymer (2) | E modulus (MPa) | Stress (MPa) | Elongation at break (%) |
| --- | --- | --- | --- |
| 0% | 1510 ± 304 | 47.1 ± 6.0 | 3.8 ± 1.4 |
| 5% | 1018 ± 41 | 46.0 ± 1.8 | 14.3 ± 4.0 |
| 10% | 1201 ± 43 | 43.6 ± 2.9 | 155.4 ± 61.5 |
| 20% | 1141 ± 64 | 47.1 ± 0.5 | 197.5 ± 25.4 |

This study has shown that incorporation of polymer (2) into the PLLA matrix not only allows reinforcement of the PLLA considering the significant increase in the elongation at break in the case of the mixtures, but also allows an improvement in the crystallization kinetics of the matrix. This system for improving the properties of PLLA has the advantages of being simple to apply and inexpensive. Indeed, the additives to be incorporated into the PLLA matrix is obtained in two steps from castor oil, an inexpensive non-food raw material and already used industrially. A first step for transesterification of castor oil with methanol gives the possibility of obtaining methyl ricinoleate which is then polymerized in order to obtain poly(methyl ricinoleate). As regards the application of the mixtures, it is ensured by twin-screw extrusion in the molten state. This method is currently used on an industrial scale and gives the possibility of obtaining a fine dispersion of the additive in the matrix, a primordial criterion for good reinforcement of the polymer.

What is claimed is:

1. A method of improving impact resistance and/or modulating nano-structuration of a polymeric matrix comprising adding a polymer of the following formula (I) to the polymeric matrix:

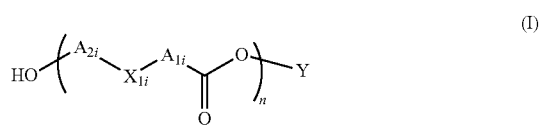

(I)

wherein:
  $A_{1i}$ represents a linear or branched divalent alkylene radical, comprising from 2 to 20 carbon atoms, said radical optionally comprising one or several unsaturations, and being optionally substituted with at least one —OAlk substituent, Alk representing an alkyl group comprising from 1 to 10 carbon atoms;
  $A_{2i}$ represents a linear or branched divalent alkylene radical comprising from 2 to 20 carbon atoms, said radical optionally comprising one or several unsaturations, and being optionally substituted with at least one —OAlk substituent, Alk representing an alkyl group comprising from 1 to 10 carbon atoms;
  $X_{1i}$ is selected from the group consisting of: —S—, —CH$_2$— and a bond;
  Y represents H, a phenyl group or an alkyl group comprising from 1 to 10 carbon atoms;
  i represents an integer varying from 1 to n;
  n represents an integer comprised from 2 to 1,000;
  provided that the total number of carbon atoms of the radicals $A_{2i}$, $X_{1i}$ and $A_{1i}$ is greater than or equal to 8;
  as additives in a polymeric matrix selected from the group consisting of matrices of polyester, poly(vinyl chloride), polyurethane, polyamide, poly(alkyl acrylate), poly(alkyl methacrylate), polystyrene and polyolefin,
  said polymer of formula (I) being different from poly(ricinoleic acid) fitting the following formula:

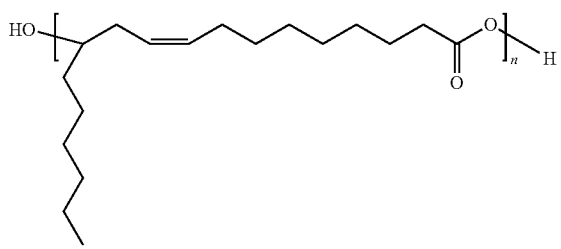

wherein n is as defined earlier;
wherein impact resistance and/or nano-structuration of the polymeric matrix is improved.

2. The method according to claim 1, of polymers of formula (I-1):

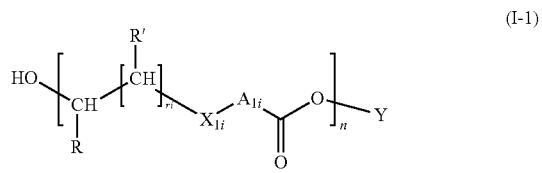

(I-1)

wherein:
  $X_{1i}$, $A_{1i}$, Y and n are as defined in claim 1;
  R represents H or a linear or branched divalent alkyl radical, comprising from 1 to 20 carbon atoms, preferably from 2 to 10, preferentially from 4 to 9, said alkyl radical being optionally substituted with at least one OAlk group, Alk representing an alkyl group comprising from 1 to 10 carbon atoms;

R' represents H or an OAlk group, Alk representing an alkyl group comprising from 1 to 10 carbon atoms;

$r_i$ represents an integer comprised from 0 to 5.

3. The method according to claim 1, wherein at least one group $A_{1i}$ comprises at least one unsaturation.

4. The method according to claim 1, wherein at least one group $X_{1i}$ represents S.

5. The method according to claim 1, of additives selected from the group consisting of polymers fitting one of the following formulae:

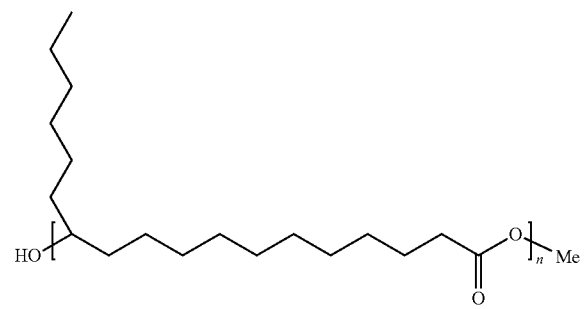

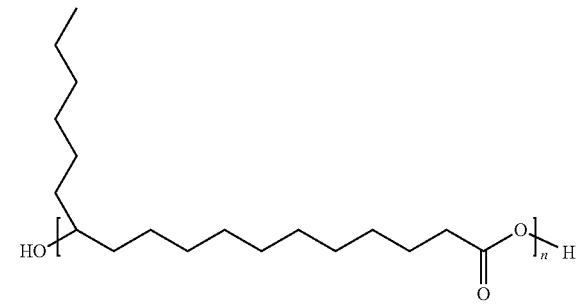

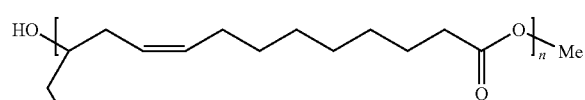

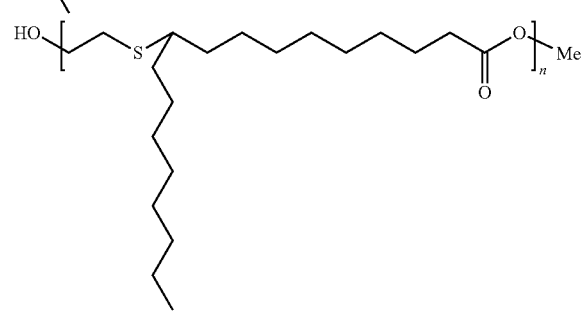

-continued

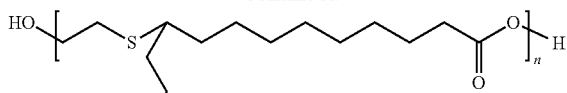

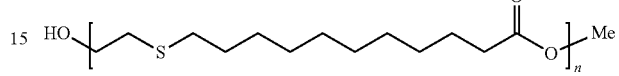

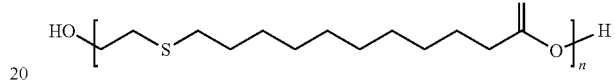

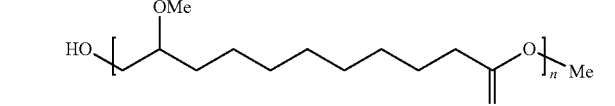

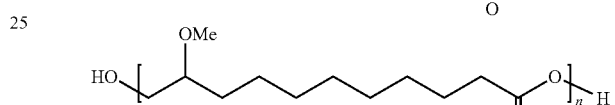

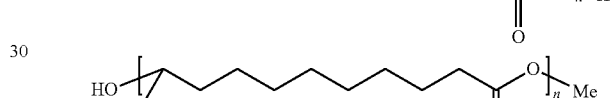

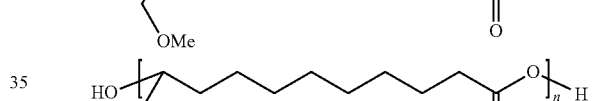

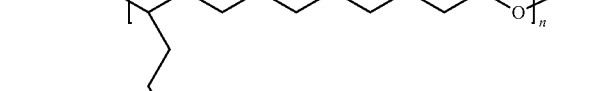

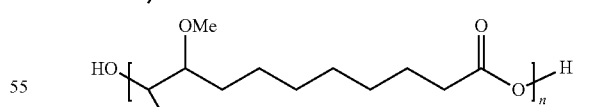

-continued

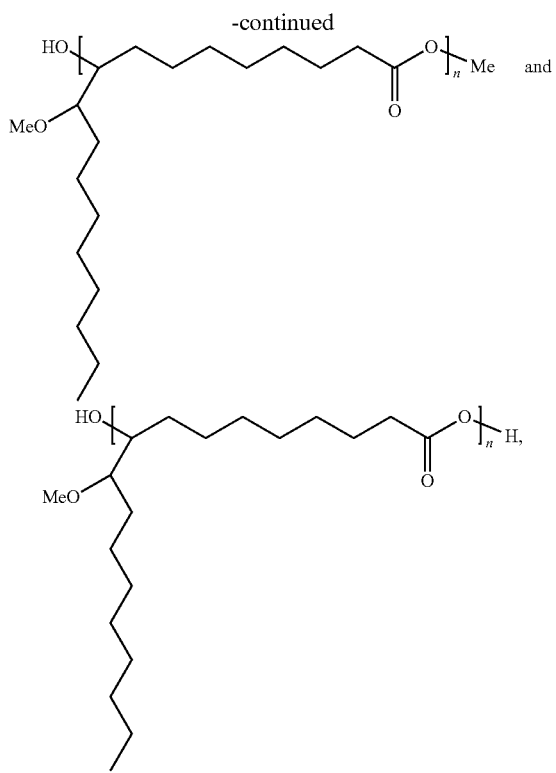
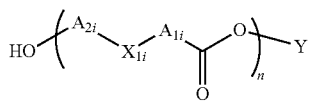

wherein n is as defined in claim 1.

6. The method according to claim 1, wherein the additive is the compound, poly(methyl ricinoleate), of the following formula:

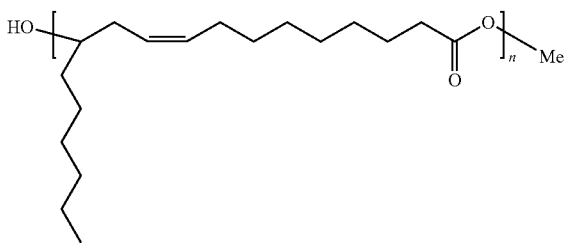

n being as defined in claim 1.

7. The method according to claim 1, wherein the polymeric matrix is a poly(lactic acid) matrix.

8. A composition comprising:
a polymeric matrix selected from the group consisting of matrices of polyester, poly(vinyl chloride), polyurethane, polyamide, poly(alkyl acrylate), poly(alkyl methacrylate), polystyrene and polyolefin;
5% to 20% by mass of a compound of formula (I), based on the total mass of the composition:

$$\text{HO}\left(\text{A}_{2i}-\text{X}_{1i}-\text{A}_{1i}-\overset{\text{O}}{\underset{\parallel}{\text{C}}}-\text{O}\right)_n\text{Y} \qquad (I)$$

wherein:
$A_{1i}$ represents a linear or branched divalent alkylene radical, comprising from 2 to 20 carbon atoms, said radical optionally comprising one or several unsaturations, and being optionally substituted with at least one —OAlk substituent, Alk representing an alkyl group comprising from 1 to 10 carbon atoms;
$A_{2i}$ represents a linear or branched divalent alkylene radical, comprising from 2 to 20 carbon atoms, said radical optionally comprising one or several unsaturations, and being optionally substituted with at least one —OAlk substituent, Alk representing an alkyl group comprising from 1 to 10 carbon atoms;
$X_{1i}$ is selected from the group consisting of: —S—, —CH$_2$— and a bond;
Y represents H, a phenyl group or an alkyl group comprising from 1 to 10 carbon atoms;
i represents an integer varying from 1 to n;
n represents an integer comprised from 2 to 1,000;
provided that the total number of carbon atoms of the radicals $A_{2i}$, $X_{1i}$ and $A_{1i}$ is greater than or equal to 8, except for poly(ricinoleic acid); and
optionally at least one other polymer selected from the group consisting of poly(butadiene), poly(isoprene), poly(ϵ-caprolactone) and poly(tetrahydrofurane).

9. A method for preparing a composition according to claim 8, comprising a step for mixing at least one polymer of formula (I) according to claim 8, and a polymeric matrix according to claim 8, said mixing step being carried out at a temperature comprised from 180° C. to 190° C., for at least 15 minutes.

10. The method according to claim 9, wherein the mixing step is carried out at 180° C. for 5 minutes.

* * * * *